US009458342B2

(12) United States Patent
Kodama et al.

(10) Patent No.: US 9,458,342 B2
(45) Date of Patent: Oct. 4, 2016

(54) LAMINATED POLYESTER FILM

(75) Inventors: Aiko Kodama, Osaka (JP); Toshihiro Koda, Maibara (JP); Masato Fujita, Maibara (JP)

(73) Assignee: MITSUBISHI PLASTICS, INC., Tokyo (JP)

(*) Notice: Subject to any disclaimer, the term of this patent is extended or adjusted under 35 U.S.C. 154(b) by 587 days.

(21) Appl. No.: 13/639,246

(22) PCT Filed: Apr. 4, 2011

(86) PCT No.: PCT/JP2011/058526
§ 371 (c)(1),
(2), (4) Date: Nov. 20, 2012

(87) PCT Pub. No.: WO2011/125978
PCT Pub. Date: Oct. 13, 2011

(65) Prior Publication Data
US 2013/0115448 A1 May 9, 2013

(30) Foreign Application Priority Data

Apr. 6, 2010 (JP) ................................. 2010-087922
Apr. 29, 2010 (JP) ................................. 2010-104630

(51) Int. Cl.
C09D 123/08 (2006.01)
C09D 123/14 (2006.01)
C09D 123/26 (2006.01)
C09D 123/36 (2006.01)
C08L 23/08 (2006.01)
C08L 23/14 (2006.01)
C08L 23/26 (2006.01)
C08L 23/28 (2006.01)
C09J 123/08 (2006.01)
C09J 123/14 (2006.01)
C09J 123/26 (2006.01)
C09J 123/28 (2006.01)
C09D 123/12 (2006.01)
C09D 151/06 (2006.01)
C08L 23/36 (2006.01)
C09J 123/36 (2006.01)
C08K 5/00 (2006.01)

(52) U.S. Cl.
CPC ........... *C09D 123/12* (2013.01); *C09D 151/06* (2013.01); *C08K 5/0025* (2013.01); *C08L 23/0846* (2013.01); *C08L 23/147* (2013.01); *C08L 23/26* (2013.01); *C08L 23/36* (2013.01); *C08L 2312/00* (2013.01); *C09D 123/0846* (2013.01); *C09D 123/147* (2013.01); *C09D 123/26* (2013.01); *C09D 123/36* (2013.01); *C09J 123/0846* (2013.01); *C09J 123/147* (2013.01); *C09J 123/26* (2013.01); *C09J 123/36* (2013.01); *C09J 2467/006* (2013.01); *Y10T 428/265* (2015.01); *Y10T 428/27* (2015.01); *Y10T 428/273* (2015.01); *Y10T 428/31797* (2015.04)

(58) Field of Classification Search
None
See application file for complete search history.

(56) References Cited

U.S. PATENT DOCUMENTS

| 4,908,411 | A | * | 3/1990 | Kinoshita et al. | 525/285 |
| 5,534,577 | A | * | 7/1996 | Namba | C08L 23/26 524/247 |
| 5,683,973 | A | * | 11/1997 | Post | C11D 17/006 510/141 |
| 5,688,855 | A | * | 11/1997 | Stoy | A61L 29/085 524/113 |
| 5,858,491 | A | * | 1/1999 | Geussens et al. | 428/36.9 |
| 5,883,188 | A | * | 3/1999 | Hwang et al. | 525/71 |
| 6,048,610 | A | * | 4/2000 | St. Coeur et al. | 428/352 |
| 6,114,021 | A | * | 9/2000 | Pankratz et al. | 428/214 |
| 7,897,677 | B2 | * | 3/2011 | Kataoka | C08F 255/00 523/407 |
| 8,236,900 | B2 | * | 8/2012 | Watanabe | C08F 8/00 525/326.1 |
| 8,519,026 | B2 | * | 8/2013 | Shalati | C08F 287/00 523/400 |
| 2002/0193526 | A1 | * | 12/2002 | Adachi et al. | 525/214 |
| 2005/0266256 | A1 | * | 12/2005 | Yamamoto et al. | 428/523 |
| 2007/0276094 | A1 | * | 11/2007 | Kakarala | B29B 9/12 525/231 |
| 2008/0050583 | A1 | * | 2/2008 | Kubo | 428/339 |
| 2009/0004487 | A1 | * | 1/2009 | Katsuta | C09D 5/24 428/457 |
| 2009/0255641 | A1 | * | 10/2009 | Seppala | B41M 5/52 162/164.3 |
| 2010/0004383 | A1 | * | 1/2010 | Watanabe | C08F 8/00 524/582 |
| 2010/0021742 | A1 | * | 1/2010 | Kataoka | C08F 255/00 428/423.1 |

FOREIGN PATENT DOCUMENTS

| GB | 2 453 449 | * | 4/2009 |
| JP | 59-036137 | * | 2/1984 |
| JP | 06-031881 | | 2/1994 |
| JP | 07-109359 | * | 4/1995 |
| JP | 08-259744 | * | 10/1996 |

(Continued)

OTHER PUBLICATIONS

International Search Report for PCT/JP2011/058526, mailed Jul. 9, 2011.

(Continued)

*Primary Examiner* — Vivian Chen
(74) *Attorney, Agent, or Firm* — Nixon & Vanderhye P.C.

(57) ABSTRACT

The present invention provides a laminated polyester film which can be suitably used for extrusion lamination with polyolefins and comprises a coating layer having an excellent adhesion property to the polyolefins, in particular, a coating layer having a remarkably excellent adhesion property to polypropylene. The laminated polyester film of the present invention comprises a polyester film and a coating layer formed on a surface of the polyester film which is formed by applying a coating composition comprising (A) a modified polyolefin having two melting points, and at least one crosslinking agent, and then drying the coating composition applied.

4 Claims, No Drawings

(56) References Cited

FOREIGN PATENT DOCUMENTS

| JP | 2000-037827 | 2/2000 |
| JP | 2004-256625 | 9/2004 |
| JP | 2006-335853 | 12/2006 |
| JP | 2010-005802 | 1/2010 |
| JP | 2010 005802 A | 1/2010 |

OTHER PUBLICATIONS

Supplementary European Search Report in EP 11 76 5878 dated Aug. 12, 2013.

* cited by examiner

LAMINATED POLYESTER FILM

This application is the U.S. national phase of International Application No. PCT/JP2011/058526, filed 4 Apr. 2011, which designated the U.S. and claims priority to Japan Application No. 2010-087922, filed 6 Apr. 2010, and Japan Application No. 2010-104630, filed 29 Apr. 2010, the entire contents of each of which are hereby incorporated by reference.

TECHNICAL FIELD

The present invention relates to a laminated polyester film having a coating layer which is excellent in adhesion property to polyolefins, in particular, polypropylene.

BACKGROUND ART

Polyester films have been expensively used in various applications because of excellent mechanical properties and processing properties thereof. In addition, laminates formed of a polyester film and a polyolefin have also been extensively used in various applications such as packaging materials because they are excellent in film strength and gas-barrier property as well as exhibit a good heat sealability, etc. In recent years, the above laminates have also been applied to automobiles and solar batteries. These laminates have been produced by the method of subjecting a polyester and a polyolefin to extrusion lamination process, or by the method of heat-sealing these materials. However, since adhesion between the polyester film and the polyolefin is poor, it is generally required to further provide an adhesive layer in order to form a laminated film formed of the polyester film and the polyolefin, which tends to induce deterioration in productivity and increase in costs. As described in Patent Documents 1 and 2, etc., there has been extensively used the method of providing an adhesion-modifying layer as an easy-bonding layer on a polyester film. However, the above method may still fail to provide a laminated polyester film having a satisfactory adhesion property to polyolefins.

Also, in Patent Document 3, there is described an aqueous coating material capable of modifying an adhesion property to polyolefins. However, the above conventional technique may also fail to improve adhesion between a polyester film and a polyolefin to a sufficient extent.

PRIOR ART DOCUMENTS

Patent Documents

Patent Document 1: Japanese Patent Application Laid-Open (KOKAI) No. 2004-256625
Patent Document 2: Japanese Patent Application Laid-Open (KOKAI) No. 8-31121
Patent Document 3: Japanese Patent No. 3759160

SUMMARY OF THE INVENTION

Problems to be Solved by the Invention

The present invention has been accomplished to solve the above conventional problems. An object of the present invention is to provide a laminated polyester film which includes a coating layer capable of exhibiting excellent adhesion to polyolefins, in particular, polypropylene.

Means for Solving Problems

As a result of the present inventors' earnest study in view of the above problems, it has been found that these problems can be readily solved by providing a coating layer comprising a specific compound on a polyester film. The present invention has been attained on the basis of this finding.

That is, in a first aspect of the present invention, there is provided a laminated polyester film comprising a polyester film and a coating layer formed on a surface of the polyester film which is formed by applying a coating composition comprising a modified polyolefin having two melting points and at least one crosslinking agent, and then drying the coating composition applied.

In a second aspect of the present invention, there is provided a laminated polyester film comprising a polyester film and a coating layer formed on a surface of the polyester film which is formed by applying a coating composition comprising a polyolefin copolymer comprising a propylene-based polymer and a hydrophilic polymer, and at least one crosslinking agent, and then drying the coating composition applied.

Effect of the Invention

In accordance with the present invention, there can be provided a laminated polyester film comprising a coating layer which is excellent in adhesion to polyolefins, in particular, polypropylene. Therefore, the present invention has a high industrial value.

PREFERRED EMBODIMENTS FOR CARRYING OUT THE INVENTION

The present invention is described in more detail below.

The base film of the coated film according to the present invention is formed of a polyester. Such a polyester may be produced by melt-polycondensing a dicarboxylic acid such as terephthalic acid, isophthalic acid, 2,6-naphthalenedicarboxylic acid, adipic acid, sebacic acid, 4,4'-diphenyl dicarboxylic acid and 1,4-cyclohexyl dicarboxylic acid or an ester of these acids, with a glycol such as ethylene glycol, diethylene glycol, triethylene glycol, propylene glycol, 1,4-butanediol, neopentyl glycol and 1,4-cyclohexane dimethanol. The polyesters obtained from these acid components and glycol components may be produced by optionally using any ordinary methods. For example, there may be adopted the method in which a lower alkyl ester of an aromatic dicarboxylic acid and a glycol are subjected to transesterification reaction, or the aromatic dicarboxylic acid and the glycol are subjected to direct esterification reaction, to thereby obtain substantially a bisglycol ester of the aromatic dicarboxylic acid or an oligomer thereof, and then the resulting product is heated under reduced pressure to subject the product to polycondensation reaction. Also, an aliphatic dicarboxylic acid may be copolymerized with the above components of the polyester according to the aimed applications thereof.

Typical examples of the polyesters used in the present invention include polyethylene terephthalate, polyethylene-2,6-naphthalate and poly-1,4-cyclohexanedimethylene terephthalate as well as polyesters obtained by copolymerizing the above acid components or glycol components therewith. These polyesters may also comprise other components or additives, if required.

For the purposes of ensuring a good traveling property of the film and preventing occurrence of flaws in the film, particles may be compounded in the polyester film of the present invention. Examples of the particles include inorganic particles such as silica, calcium carbonate, magnesium carbonate, calcium phosphate, kaolin, talc, aluminum oxide, titanium oxide, alumina, barium sulfate, calcium fluoride, lithium fluoride, zeolite and molybdenum sulfide, organic particles such as crosslinked polymer particles and calcium oxalate as well as deposited particles obtained during the process for production of the polyester.

The particle diameter and content of the particles used in the polyester film may be determined depending upon the applications and objects of the resulting film. The average particle diameter of the particles used in the present invention is usually in the range of 0.01 to 5.0 μm. When the average particle diameter of the particles is more than 5.0 μm, the surface roughness of the obtained film tends to be too coarse, so that the particles tend to be fallen off from the surface of the film. When the average particle diameter of the particles is less than 0.01 μm, the particles may fail to impart a sufficient easy-slipping property to the polyester film owing to a very small surface roughness of the film. The content of the particles in the polyester film is usually in the range of 0.0003 to 1.0% by weight and preferably 0.0005 to 0.5% by weight based on the weight of the polyester. When the content of the particles in the polyester film is less than 0.0003% by weight, the resulting film tends to be insufficient in easy-slipping property. On the other hand, when the content of the particles in the polyester layer is more than 1.0% by weight, the resulting film tends to be insufficient in transparency. Meanwhile, when it is intended to ensure specific properties of the film, in particular, transparency, smoothness or flatness, etc., the polyester film may comprise substantially no particles. In addition, various additives such as stabilizers, lubricants and antistatic agents may also be appropriately added to the film.

The polyester film used in the present invention may be produced by using any conventionally known film-forming methods without any particular limitation. For example, a melt-extruded sheet is first stretched at a temperature of 70 to 145° C. and a stretch ratio of 2 to 6 times in one direction thereof by a roll stretching method to obtain a monoaxially stretched polyester film. Then, the thus obtained monoaxially stretched film is introduced into a tenter and stretched therein at a temperature of 80 to 160° C. and a stretch ratio of 2 to 6 times in the direction perpendicular to the previous stretching direction. The resulting stretched sheet is then heat-treated at a temperature of 150 to 250° C. for a period of 1 s to 600 s to thereby obtain a biaxially stretched film. Further, upon the heat treatment, in the heat-treating zone and/or a cooling zone located at an outlet of the heat-treating zone, the resulting film is preferably subjected to relaxation by 0.1 to 20% in longitudinal and/or lateral directions thereof.

The polyester film used in the present invention may have either a single layer structure or a multi-layer structure. In the polyester film having a multi-layer structure, surface layers and an inner layer thereof or both the surface layers or the respective layers may be formed of different materials from each other according to the applications or objects of the resulting film.

The polyester film used in the present invention is provided on at least one surface thereof with an easy-bonding coating layer. However, as a matter of course, it should be noted that the polyester film having the other coating layer or functional layer on a surface thereof opposite to the surface on which the above easy-bonding coating layer is provided, is also involved in the scope of the present invention.

The easy-bonding coating layer of the present invention is formed by applying a coating composition on the polyester film. The coating may be conducted by various methods. Among them, there may be suitably used a so-called in-line coating method in which a coating layer is formed on a film during production of the film, in particular, a coating and stretching method in which a stretching step is conducted after the above coating step.

In the in-line coating method, the coating step is conducted during the process of producing the polyester film. More specifically, the in-line coating method is a method in which a polyester film is subjected to a coating step at an optional stage during a period of from melt-extrusion of a raw polyester through biaxial stretching and then heat-fixing thereof up to taking-up of the resulting film. Usually, either a substantially amorphous unstretched sheet obtained after rapidly cooling a molten polyester, a monoaxially stretched film obtained by stretching the unstretched sheet in a length direction (longitudinal direction) thereof or a biaxially stretched film before being heat-fixed is subjected to the coating step. In particular, as the excellent coating and stretching method, there is used the method in which after subjecting the monoaxially stretched film to the coating step, the resulting coated film is subjected to stretching in a lateral direction thereof. The above method has an advantage of reduction in production costs because formation of the film and provision of the coating layer can be conducted at the same time. Further, in the above method, since the stretching step is conducted after the coating step, the resulting film is stabilized in adhesion performance thereof owing to formation of a thin uniform coating layer. In addition, in the above method, the polyester film before subjected to biaxial stretching is first coated with an easy-bonding resin layer, and then both the film and coating layer are stretched together at the same time, so that the based film and the coating layer are strongly adhered to each other. Also, when subjecting the polyester film to biaxial stretching, the polyester film is stretched in a lateral direction thereof while gasping the end portions of the film by a tenter. Thus, since the polyester film is restrained in both a longitudinal direction and a lateral direction thereof, the film can be exposed to a high temperature while maintaining its flatness without occurrence of wrinkles, etc., upon the heat-fixing. Therefore, the heat treatment after the coating step can be conducted at such a high temperature as being unachievable by the other conventional methods. As a result, the obtained coating layer can be enhanced in film-forming property, so that the coating layer and the polyester film can be strongly adhered to each other. The uniformity of the coating layer, the enhanced film-forming property and the strong adhesion between the coating layer and the polyester film frequently result in production of an easy-bonding polyester film having preferred properties.

In this case, the coating solution used in the above method is suitably in the form of an aqueous solution or a water dispersion from the standpoints of handling, working environments and safety. However, the coating solution may also comprise an organic solution in such a range as not to depart from the scope of the present invention as far as the coating solution comprises water as a main medium.

Next, the coating layer provided on the film according to the present invention is described.

The coating layer according to the first aspect of the present invention is formed of a coating composition comprising a modified polyolefin having two melting points and at least one crosslinking agent.

The coating layer according to the second aspect of the present invention is formed of a coating composition comprising a polyolefin copolymer comprising a propylene-based polymer and a hydrophilic polymer and at least one crosslinking agent.

Modified Polyolefin Having Two Melting Points

The above polyolefin is a polymer obtained by polymerizing an alkene such as ethylene and propylene, and may also include a copolymer having such a polymer structure. Meanwhile, the polyolefin used in the present invention is preferably a polypropylene-based polymer.

The above polyolefin has two melting points (Tm) of which a melting point Tm1 on a lower temperature side is preferably in the range of 0 to 50° C. and a melting point Tm2 on a higher temperature side is preferably in the range of 50 to 180° C. The melting point Tm2 on a higher temperature side is more preferably in the range of 50 to 100° C.

For example, the polyolefin may be produced by copolymerizing an olefin-based polymer and preferably a propylene-based polymer, with a compound having a melting point of 0 to 50° C. The compound to be copolymerized is preferably a hydrophilic compound because when using a hydrophobic compound as the above compound, it may be difficult to disperse the resulting polyolefin copolymer in water. As the hydrophilic compound, there may be suitably used polyalkyleneoxides and polyalkyleneimines. Specific examples of the hydrophilic compound include polyethyleneoxide, polypropyleneoxide and polyethyleneimine.

In the present invention, the "melting point" as used herein means a temperature at which an endothermic peak is observed when subjecting a sample obtained by vacuum-drying an aqueous solution or a water dispersion of a polyolefin to DSC measurement (differential scanning calorimetry) in which the sample is heated from −100° C. to 200° C. at a temperature rise rate of 10° C./min, rapidly cooled to −100° C. and thereafter heated again to 200° C. at a temperature rise rate of 10° C./min.

In the following, the polypropylene-based polymer as the preferred polyolefin is described in detail.

The propylene-based polymer used in the present invention is not particularly limited unless the effects of the present invention are adversely affected, and various known propylene-based polymers and modified propylene-based polymers may be used in the present invention. Also, the propylene-based polymer may be in the form of either a reactive group-containing propylene-based polymer or a propylene-based polymer with no reactive group.

Examples of the propylene-based polymer with no reactive group include a propylene homopolymer, a copolymer of ethylene and propylene, a copolymer of propylene with the other comonomer, for example, a copolymer of propylene with an α-olefin comonomer having 2 or more carbon atoms such as 1-butene, 1-pentene, 1-hexene, 1-heptene, 1-octene, cyclopentene and cyclohexene, and a copolymer of propylene with two or more comonomers selected from these comonomers. Specific examples of the propylene-based polymer include polypropylene, an ethylene-propylene copolymer, a propylene-butene copolymer, an ethylene-propylene-butene copolymer, a propylene-hexene copolymer, a chlorinated polypropylene, a chlorinated ethylene-propylene copolymer and a chlorinated propylene-butene copolymer.

Meanwhile, the above copolymer may be in the form of either a random copolymer or a block copolymer. Among these copolymers, preferred is the random copolymer whose melting point can be more effectively reduced. The reduction in melting point of the copolymer is advantageous because the resulting film can be heat-sealed at a reduced temperature.

As the reactive group-containing propylene-based polymer, there may be used, for example, a copolymer (a) obtained by copolymerizing an unsaturated compound with no reactive group and a reactive group-containing unsaturated compound upon polymerization of propylene, and a polymer (b) obtained by grafting a reactive group-containing radical polymerizable unsaturated compound to a propylene-based polymer. The copolymer (a) may be obtained by copolymerizing the unsaturated compound with no reactive group and the reactive group-containing unsaturated compound, and is in the form of a copolymer having a main chain into which the reactive group-containing unsaturated compound is introduced. For example, such a copolymer is obtained by copolymerizing an α-olefin such as ethylene, propylene and butene and an α,β-unsaturated carboxylic acid or anhydride such as acrylic acid and maleic anhydride. Specific examples of the copolymer include a propylene-acrylic acid copolymer and a propylene-acrylic ester-maleic anhydride copolymer. The polymer (b) is obtained by grafting a reactive group-containing radical polymerizable unsaturated compound to a previously polymerized propylene-based polymer in which the reactive group-containing unsaturated compound is grafted to a main chain of the polymer. Examples of the copolymer (b) include polymers obtained by grafting (meth)acrylic acid, fumaric acid, maleic acid or maleic anhydride, itaconic acid or itaconic anhydride, crotonic acid, 2-hydroxyethyl (meth)acrylate or 2-hydroxypropyl (meth)acrylate, (meth)acrylamide, (dimethylamino)ethyl (meth)acrylate, glycidyl (meth)acrylate, (2-isocyanato)ethyl (meth)acrylate or the like to a propylene-based copolymer such as polypropylene and a propylene-butene copolymer. These copolymers or polymers may be used alone or in combination of any two or more thereof. Meanwhile, the propylene-based polymer may be in the form of either a linear polymer or a branched polymer.

Examples of the reactive group used in the reactive group-containing polypropylene-based polymer include a carboxyl group, a dicarboxylic anhydride group, a carboxylic anhydride monoester group, a hydroxyl group, an amino group, an epoxy group and an isocyanate group. The propylene-based polymer more preferably comprises at least one group selected from the group consisting of carboxylic acid derivative groups, i.e., a carboxyl group, a dicarboxylic anhydride group and a dicarboxylic anhydride monoester group. These reactive groups such as carboxyl group not only have a high reactivity and therefore are readily bonded to various polymers, but also are capable of readily subjecting a large amount of the unsaturated compounds comprising these groups to copolymerization reaction or grafting reaction with the propylene-based polymer.

In addition, the propylene-based polymer to which an acid group is bonded may be directly used as the polymer. Meanwhile, the propylene-based polymer may be in the form of either a linear polymer or a branched polymer.

The most preferred polyolefin used in the present invention is a copolymer having a polypropylene structure and a polyethyleneoxide structure, more specifically, a copolymer obtained by grafting polyethyleneoxide to a polymer having a polypropylene structure.

Polyolefin Copolymer Comprising Propylene-Based Polymer and Hydrophilic Polymer

The above propylene-based polymer is not particularly limited unless the effects of the present invention are adversely affected, and various known propylene-based copolymers and modified propylene-based polymers may be used in the present invention. Also, the propylene-based polymer may be either a reactive group-containing propylene-based polymer or a propylene-based polymer with no reactive group. The details of these propylene-based polymers are the same as described above.

In the present invention, both the propylene-based polymer with no reactive group and the reactive group-containing propylene-based polymer may be appropriately used according to combination with the hydrophilic polymer or properties of the polymer as the aimed product. Among these polymers, the reactive group-containing propylene-based polymer is preferably used. This is because the reactive group-containing propylene-based polymer is capable of advantageously controlling an amount of the hydrophilic polymer to be bonded thereto and undergoing various reactions upon bonding.

The hydrophilic polymer is not particularly limited unless the effects of the present invention are adversely affected, and any of synthetic polymers, semi-synthetic polymers and natural polymers may be used in the present invention. Among these polymers, preferred are synthetic polymers because they are readily controlled in degree of hydrophilicity and exhibit stable properties, and more preferred are acrylic-based resins such as poly(meth)acrylic resins, polyvinyl alcohol resins, polyvinyl pyrrolidone resins and polyether resins. These polymers may be used alone or in combination of any two or more thereof. Among these polymers, most preferred are polyether resins because they exhibit a high hydrophilicity.

The polyether resins used in the present invention may be usually obtained by subjecting a cyclic alkyleneoxide or a cyclic alkyleneimine to ring opening polymerization. The method of bonding the above compound to the propylene-based polymer is not particularly limited. There may be used, for example, the method in which the cyclic alkyleneoxide is subjected to ring opening polymerization in the presence of the reactive group-containing propylene-based polymer, the method in which a reactive group-containing hydrophilic polymer obtained by ring opening polymerization, etc., such as polyether polyol and polyether amine is reacted with a reactive group-containing propylene-based polymer, or the like.

The polyether amine is a compound in the form of a resin having a polyether skeleton which comprises a primary or secondary amino group as a reactive group at one terminal end or both terminal ends thereof. The polyether polyol is a compound in the form of a resin having a polyether skeleton which comprises a hydroxyl group as a reactive group at one terminal end or both terminal ends thereof. Examples of the preferred polyalkyleneoxide or polyalkyleneimine having a hydrophilicity include polyethyleneoxide, polypropyleneoxide and polyethyleneimine.

Examples of a reaction product of the propylene-based polymer and the hydrophilic polymer include a graft copolymer obtained by graft-bonding the hydrophilic polymer to the propylene-based polymer, and a block copolymer of the propylene-based polymer and the hydrophilic polymer in which the hydrophilic polymer is bonded to one terminal end or both terminal ends of the propylene-based polymer. Among these copolymers, preferred is the graft copolymer.

This is because the graft copolymer has such an advantage that a content of the hydrophilic polymer therein is readily controlled, and tends to be increased as compared to the that in the block copolymer.

The polyolefin is most preferably a copolymer comprising the reactive group-containing propylene-based polymer and polyethyleneoxide, more specifically, a copolymer obtained by grafting polyethyleneoxide to maleic anhydride-modified polypropylene.

An optimum ratio between the propylene-based polymer and the hydrophilic group in the polyolefin may be controlled such that a weight ratio of the propylene-based polymer to the hydrophilic group (propylene-based polymer: hydrophilic group) lies within the range of 100:5 to 100:500. When the proportion of the hydrophilic group is smaller than the above-specified range, the resulting polymer may fail to be well dispersed in water, so that dispersed particles tend to have a very large diameter and therefore tend to suffer from aggregation or separation. On the other hand, when the proportion of the hydrophilic group is larger than the above-specified range, there is such a tendency that adhesion between the propylene polymer and the polyolefin is deteriorated.

Crosslinking Agent

The crosslinking agent may be used in combination with the polyolefin in order to increase a hardness of the resulting coating layer and enhance a water resistance thereof. The hard coating layer tends to be usually deteriorated in adhesion property such as heat sealability. However, in the present invention, by using the respective polyolefins in combination with the crosslinking agent, it is possible to attain an extremely excellent adhesion property of the resulting coating layer.

The crosslinking agent used in the present invention means a compound capable of undergoing a crosslinking reaction by action of heat such as oxazoline-based crosslinking agents, epoxy-based crosslinking agents, isocyanate-based crosslinking agents and carbodiimide-based crosslinking agents. The optimum amount of the crosslinking agent added may vary depending upon kinds of crosslinking agents used because they have different crosslinking points (crosslinking density) from each other. The details of the crosslinking agent are described below.

The oxazoline-based crosslinking agents used in the present invention are those compounds having an oxazoline group in a molecule thereof. Especially preferred are polymers which are synthesized by using a monomer having an oxazoline group in a molecule thereof as at least one of raw monomers. As the oxazoline compounds, there may be mentioned 2-oxazoline compounds, 3-oxazoline compounds and 4-oxazoline compounds. In the present invention, any of the above oxazoline compounds may be used. In particular, the 2-oxazoline compounds have been industrially preferably used because of their high reactivity. Specific examples of the 2-oxazoline compounds include 2-vinyl-2-oxazoline, 5-methyl-2-vinyl-2-oxazoline, 4,4-dimethyl-2-vinyl-2-oxazoline, 4,4-dimethyl-2-vinyl-5,6-dihydro-4H-1,3-oxazoline, 4,4,6-trimethyl-2-vinyl-5,6-dihydro-4H-1,3-oxazoline, 2-isopropenyl-2-oxazoline, 4,4-dimethyl-2-isopropenyl-2-oxazoline, 4-acryloyl-oxymethyl-2,4-dimethyl-2-oxazoline, 4-methacryloyl-oxymethyl-2,4-dimethyl-2-oxazoline, 4-methacryloyl-oxymethyl-2-phenyl-4-methyl-2-oxazoline, 2-(4-vinylphenyl)-4,4-dimethyl-2-oxazoline, 4-ethyl-4-hydroxymethyl-2-isopropenyl-2-oxazoline and 4-ethyl-4-carboethoxymethyl-2-isopropenyl-2-oxazoline, although not particularly limited thereto. The oxazoline group-containing polymer used in the present invention may be copolymerized with the other optional monomer copolymerizable therewith.

The proportion of the oxazoline-based crosslinking agent compounded with the polyolefin is controlled such that the weight ratio of olefin to oxazoline (olefin/oxazoline) is preferably 87/7 to 10/84, more preferably 87/7 to 50/44 and especially preferably 80/14 to 70/34. The oxazoline-based crosslinking agent may also be used in combination with the epoxy group-containing crosslinking agent.

The isocyanate crosslinking agent used in the present invention is not particularly limited, and any known polyisocyanate crosslinking agents may be used as long as the crosslinking agents are in the form of a compound comprising an isocyanate group as a functional group. More specifically, generally used water-dispersible type polyisocyanate-based crosslinking agents may be used in the present invention. The water-dispersible type polyisocyanate-based crosslinking agents are those obtained by introducing a hydrophilic group into polyisocyanate polymers which are dispersed in the form of fine particles when added to water and stirred.

Examples of polyisocyanates constituting the water-dispersible type polyisocyanate include aliphatic isocyanates such as hexamethylene diisocyanate, trimethyl hexamethylene diisocyanate, tetramethylene diisocyanate, pentamethylene diisocyanate, lysine diisocyanate and dimer acid diisocyanates; aromatic polyisocyanates such as tolylene diisocyanate, xylylene diisocyanate, diphenylmethane diisocyanate, tetramethyl xylylene diisocyanate, 1,5-naphthalene diisocyanate, 1,4-naphthalene diisocyanate, 4,4'-toluidine diisocyanate, 4,4'-diphenyl ether isocyanate, (m- or p-)phenylene diisocyanate, 4,4'-biphenylene diisocyanate, 3,3'-biphenylene diisocyanate, bis(4-isocyanatophenyl)sulfone and isopropylidene bis(4-phenyl isocyanate); and alicyclic diisocyanates such as hydrogenated xylylene diisocyanate, isophorone diisocyanate, 4,4'-methylene bis(cyclohexyl isocyanate), methyl-cyclohexane-2,4-(or -2,6-)diisocyanate, 1,3-(or 1,4-)di(isocyanatomethyl)cyclohexane, 1,4-cyclohexane diisocyanate, 1,3-cyclopentane diisocyanate and 1,2-cyclohexane diisocyanate. As the polyisocyanate compounds, there may also be used polyisocyanate compounds having an isocyanurate structure, a urethane structure, a biuret structure, an allophanate structure, a uretdione structure, a trimer structure or the like. In addition, there may also be used a so-called blocked isocyanate in which an isocyanate group is blocked with an active hydrogen group.

The proportion of the isocyanate-based crosslinking agent compounded is controlled such that the weight ratio of olefin to isocyanate (olefin/isocyanate) in the coating composition is preferably 80/14 to 30/64 and more preferably 80/14 to 40/54.

The carbodiimide-based crosslinking agent used in the present invention is a compound having a carbodiimide group in a molecule thereof. In particular, among these compounds, preferred are polycarbodiimide compounds having two or more carbodiimide groups in a molecule thereof. The polycarbodiimide compounds may be obtained using an organic polyisocyanate, and especially preferably an organic diisocyanate as a main synthesis raw material as described in Japanese Patent Application Laid-Open (KOKAI) No. 10-316930 (1998) or Japanese Patent Application Laid-Open (KOKAI) No. 11-140164.

The proportion of the carbodiimide-based crosslinking agent compounded is controlled such that the weight of olefin to carbodiimide (olefin/carbodiimide) in the coating composition is preferably 80/14 to 30/64 and more preferably 60/34 to 40/54. Any of the above crosslinking agents are incapable of forming an easy-bonding layer having good adhesion to polyolefins by themselves, and therefore must be used in combination with olefins for forming the easy-bonding layer.

In the present invention, in order to impart an easy-bonding property to the film and preventing occurrence of blocking of the film, the coating layer may comprise particles. When the content of the particles in the coating layer is excessively large, the resulting coating layer tends to be deteriorated in transparency, continuity, film strength and easy-bonding property. The content of the particles in the coating layer is preferably not more than 15% by weight and more preferably not more than 10% by weight. The lower limit of the content of the particles in the coating layer is not particularly limited.

Examples of the particles include inorganic particles such as silica, alumina and metal oxides, and organic particles such as crosslinked polymer particles. Among these particles, from the standpoints of good dispersibility in the coating layer and high transparency of the resulting coating layer, especially preferred are silica particles.

When the particle diameter of the particles is excessively small, it may be difficult to attain the effect of preventing occurrence of blocking of the film. On the other hand, when the particle diameter of the particles is excessively large, the particles tend to fall off from the coating layer. The average particle diameter of the particles is preferably about ½ to about 10 times a thickness of the coating layer. Further, when the particle diameter of the particles is excessively large, the resulting coating layer tends to be deteriorated in transparency. The average particle diameter of the particles is preferably not more than 300 nm and more preferably not more than 150 nm. The average particle diameter as described herein means the value determined from a 50% number-average particle diameter of the particles as measured with respect to a dispersion of the particles using "Microtrack UPA" manufactured by Nikkiso Co, Ltd.

The coating solution used for forming the easy-bonding coating layer comprises the above-described components as essential components, and may also comprise the other components. Examples of the other components include various additives such as a surfactant, the other binders, a defoaming agent, a coatability improver, a thickening agent, an antioxidant, an ultraviolet absorber, a foaming agent, a dye, a pigment and the other crosslinking agents. These additives may be used alone or in combination of any two or more thereof, if required.

In the present invention, as the method of applying the coating solution onto the polyester film, there may be used conventionally known coating techniques as described, for example, in Yuji HARAZAKI, "Coating Methods", Makishoten, 1979. Specific examples of the coating techniques include those techniques using an air doctor coater, a blade coater, a rod coater, a knife coater, a squeeze coater, a dip coater, a reverse roll coater, a transfer roll coater, a gravure coater, a kiss roll coater, a cast coater, a spray coater, a curtain coater, a calender coater, an extrusion coater, a bar coater or the like.

Meanwhile, in order to improve coatability and adhesion of a coating agent onto the polyester film, the film may be subjected to chemical treatment, corona discharge treatment, plasma treatment, etc., before applying the coating agent thereto. The lower limit of a coating amount of the coating layer provided on the polyester film is $0.005$ g/m$^2$, preferably $0.01$ g/m$^2$ and especially preferably $0.02$ g/m$^2$. On the other hand, the upper limit of a coating amount of the coating layer provided on the polyester film is 0.1 g/m², preferably 0.08 g/m² and especially preferably 0.06 g/m².

When the coating amount of the coating layer is less than 0.005 g/m², adhesion of the coating layer to olefins tends to be insufficient. When the coating amount of the coating layer is more than 0.1 g/m², the resulting coating layer tends to be deteriorated in appearance.

EXAMPLES

The present invention is described in more detail below by Examples. However, these Examples are only illustrative and not intended to limit the present invention thereto, and various modifications and changes are involved in the scope of the present invention unless they depart therefrom. Among the following Examples and Comparative Examples, the mark "A" is affixed to those relating to the above first aspect of the present invention, whereas the mark "B" is affixed to those relating to the above second aspect of the present invention. Meanwhile, the measuring and evaluating methods used in the following Examples and Comparative Examples are as follows.

(1) Adhesion Property

A heat seal sample was prepared for evaluation of adhesion property under the following conditions. That is, a polyester film and an unstretched homopolypropylene film (thickness: 60 μm; melting point: 168° C.; melt flow rate: 15 g/10 min) were overlapped on each other such that a coating layer surface of the polyester film was faced to the unstretched film. Further, an uncoated polyester film was overlapped on the polypropylene film. The thus laminated sample was pressed at a heat seal temperature of 160° C. under a pressing pressure of 5 kg/cm² for 2 min, thereby preparing an evaluation sample having a heat seal width of 1.5 cm. Thereafter, the sample was slowly torn by hands from a boundary surface between the coating layer surface of the polyester film and the unstretched homopolypropylene film to evaluate adhesion property therebetween. The evaluation ratings are as follows.

5: Strongly adhered to each other, and further tearing caused breakage of the film.
4: Slightly peeled at heat seal portions, but immediately broken.
3: Peelable by hands, but still strongly adhered.
2: Simply peeled by hands.
1: Not adhered.

(2) Appearance

Using a halogen light, an appearance of the coating layer was visually observed and evaluated according the following ratings.

5: Good appearance of the coating layer.
4: Slight unevenness was observed on a part of the coating layer.
3: Slight unevenness was observed on a whole surface of the coating layer.
2: Unevenness was observed on a whole surface of the coating layer.
1: Severe unevenness was clearly observed on a whole surface of the coating layer.

The polyester raw materials used in the following Examples and Comparative Examples are as follows.

(Polyester 1): Polyethylene terephthalate comprising substantially no particles and having an intrinsic viscosity of 0.66.

(Polyester 2): Polyethylene terephthalate comprising amorphous silica particles having an average particle diameter of 2.5 μm in an amount of 0.6 part by weight and having an intrinsic viscosity of 0.66.

The following components were used in a coating composition. The "part(s)" used hereunder represents a weight ratio in terms of a resin solid content.

(A1): Polyethylene glycol-modified polypropylene having two melting points (i.e., Tm1: about 20° C.; Tm2: about 70° C.)

(A2): Carboxyl group-containing polypropylene having two melting points (i.e., Tm1: about 30° C.; Tm2: about 150° C.)

(A3): Modified polypropylene having one melting point (i.e., Tm: 160° C.)

(A4): 20% Water dispersion of a modified polyolefin as a polymer having a polypropylene structure which was obtained by heating polypropylene (350 parts) and maleic anhydride (17.5 parts) in toluene to react them with each other by a conventionally known method.

(A5): 28% Water dispersion of a modified polyolefin obtained by modifying the polymer having a polypropylene structure with polyethyleneoxide, i.e., a modified polyolefin obtained by heating a compound (300 parts) produced by the same method as used for production of the (A4) and methoxy-poly(oxyethylene/oxypropylene)-2-propyl amine (molecular weight: 1000) (75 parts) in toluene to react them with each other by a conventionally known method.

(B1): Oxazoline group-containing crosslinking agent "WS-500" (produced by Nippon Shokubai Co., Ltd.)

(B2): Epoxy group-containing crosslinking agent "EX-521" (produced by Nagase Chemtex Corp.)

(B3): Isocyanate-based crosslinking agent "BWD102" (produced by Nippon Polyurethane Industry Co., Ltd.)

(B4): Carbodiimide group-containing crosslinking agent "E02" (produced by Nisshinbo Corp.)

Examples 1A to 31A and Comparative Examples 1A to 7A

The polyester 1 and the polyester 2 were blended with each other at a weight ratio of 95/5, and fully dried. Then, the thus blended mixture was heated and melted at a temperature of 280 to 300° C., and extruded into a sheet shape from a T-die, and adhered onto a cooling drum having a mirror surface controlled to a temperature of 40 to 50° C. by an electrostatic adhesion method to cool and solidify the thus extruded sheet on the cooling drum, thereby obtaining an unstretched polyethylene terephthalate film. The resulting film was passed through a group of heating rolls heated to 85° C. to stretch the film in a longitudinal direction thereof at a stretch ratio of 3.7 times, thereby obtaining a monoaxially oriented film. One surface of the thus obtained monoaxially oriented film was coated with the coating composition shown in Table 1 below. Next, the thus coated film was introduced into a tenter stretching machine and stretched at 100° C. at a stretch ratio of 4.0 times in a width direction thereof while drying the coating composition applied thereto by a heat generated in the tenter. The resulting film was further heat-treated at 230° C., thereby obtaining a 38 μm-thick biaxially oriented polyethylene terephthalate film having a coating layer with a given thickness. Properties of the resulting film are shown in Table 1.

As shown in Examples 1A to 31A, the laminated polyester films obtained according to the present invention exhibited a good adhesion property. Whereas, in Comparative Example 1A in which the coating layer comprised no crosslinking agent, the resulting film failed to exhibit a good adhesion property. In addition, as shown in Comparative Examples 2A to 4A in which the olefins having only one melting point were used, the resulting films were insufficient in adhesion property irrespective of kinds of crosslinking agents used. Further, in Comparative Examples 5A to 7A in which the crosslinking agent was used alone, the resulting coating layer failed to exhibit an excellent adhesion property to polypropylene. Meanwhile, in Examples 18A to 20A in which a thickness of the respective coating layers was relatively large, coating unevenness was noticeable and therefore the resulting films were slightly deteriorated in appearance.

Examples 1B to 28B and Comparative Examples 1B to 7B

The polyester 1 and the polyester 2 were blended with each other at a weight ratio of 95/5, and fully dried. Then, the thus blended mixture was heated and melted at a temperature of 280 to 300° C., and extruded into a sheet shape from a T-die, and adhered onto a cooling drum having a mirror surface controlled to a temperature of 40 to 50° C. by an electrostatic adhesion method to cool and solidify the thus extruded sheet on the cooling drum, thereby obtaining an unstretched polyethylene terephthalate film. The resulting film was passed through a group of heating rolls heated to 85° C. to stretch the film in a longitudinal direction thereof at a stretch ratio of 3.7 times, thereby obtaining a monoaxially oriented film. One surface of the thus obtained monoaxially oriented film was coated with the coating composition shown in Table 2 below. The thus coated film was introduced into a tenter stretching machine and stretched at 100° C. at a stretch ratio of 4.0 times in a width direction thereof while drying the coating composition applied thereto by a heat generated in the tenter. The resulting film was further heat-treated at 230° C., thereby obtaining a 38 μm-thick biaxially oriented polyethylene terephthalate film having a coating layer with a given thickness. Properties of the resulting film are shown in Table 2.

As shown in Examples 1B to 28B, the laminated polyester films obtained according to the present invention exhibited a good adhesion property. Whereas, in Comparative Example 1B in which the coating layer comprised no crosslinking agent, the resulting film failed to exhibit a good adhesion property. In addition, as shown in Comparative Examples 2B to 4B in which the crosslinking agent was used alone, the resulting coating layers failed to exhibit an excellent adhesion property to PP. Further, in Comparative Examples 5B to 7B in which the polyolefin grafted with no polyethyleneoxide was used, the resulting coating layers failed to exhibit a sufficient adhesion property. Meanwhile, in Examples 18B to 20B in which a thickness of the respective coating layers was relatively large, coating unevenness was noticeable and therefore the resulting films were slightly deteriorated in appearance.

TABLE 1

| Examples | Proportions of components (weight part) Polyolefin | | |
|---|---|---|---|
| | (A1) | (A2) | (A3) |
| Example 1A | 87 | | |
| Example 2A | 80 | | |
| Example 3A | 70 | | |
| Example 4A | 60 | | |
| Example 5A | 50 | | |
| Example 6A | 40 | | |
| Example 7A | 30 | | |
| Example 8A | 10 | | |
| Example 9A | 87 | | |
| Example 10A | 80 | | |
| Example 11A | 70 | | |
| Example 12A | 60 | | |
| Example 13A | 50 | | |
| Example 14A | 60 | | |
| Example 15A | 60 | | |
| Example 16A | 60 | | |
| Example 17A | 60 | | |
| Example 18A | 60 | | |
| Example 19A | 60 | | |
| Example 20A | 60 | | |
| Example 21A | 80 | | |
| Example 22A | 60 | | |
| Example 23A | 40 | | |
| Example 24A | 30 | | |
| Example 25A | 80 | | |
| Example 26A | 60 | | |
| Example 27A | 40 | | |
| Example 28A | 30 | | |
| Example 29A | | 60 | |
| Example 30A | | 60 | |
| Example 31A | | 60 | |

| Examples | Proportions of components (weight part) Crosslinking agent | | | |
|---|---|---|---|---|
| | (B1) | (B2) | (B3) | (B4) |
| Example 1A | 7 | | | |
| Example 2A | 14 | | | |
| Example 3A | 24 | | | |
| Example 4A | 34 | | | |
| Example 5A | 44 | | | |
| Example 6A | 54 | | | |
| Example 7A | 64 | | | |
| Example 8A | 84 | | | |
| Example 9A | 7 | | | |
| Example 10A | 14 | | | |
| Example 11A | 24 | | | |
| Example 12A | 34 | | | |
| Example 13A | 44 | | | |
| Example 14A | 24 | 10 | | |
| Example 15A | 24 | 10 | | |
| Example 16A | 24 | 10 | | |
| Example 17A | 24 | 10 | | |
| Example 18A | 24 | 10 | | |
| Example 19A | 24 | 10 | | |
| Example 20A | 24 | 10 | | |
| Example 21A | | | 14 | |
| Example 22A | | | 34 | |
| Example 23A | | | 54 | |
| Example 24A | | | 64 | |
| Example 25A | | | | 14 |
| Example 26A | | | | 34 |
| Example 27A | | | | 54 |
| Example 28A | | | | 64 |
| Example 29A | 34 | | | |
| Example 30A | | | 34 | |
| Example 31A | | | | 34 |

| Examples | Coating thickness (g/cm²) | Appearance | Adhesion property |
|---|---|---|---|
| Example 1A | 0.02 | 4 | 5 |
| Example 2A | 0.02 | 4 | 5 |
| Example 3A | 0.02 | 4 | 5 |
| Example 4A | 0.02 | 4 | 5 |
| Example 5A | 0.02 | 4 | 5 |
| Example 6A | 0.02 | 4 | 5 |
| Example 7A | 0.02 | 4 | 5 |
| Example 8A | 0.02 | 4 | 5 |
| Example 9A | 0.005 | 5 | 4 |

TABLE 1-continued

| | | | |
|---|---|---|---|
| Example 10A | 0.005 | 5 | 4 |
| Example 11A | 0.005 | 5 | 4 |
| Example 12A | 0.005 | 5 | 4 |
| Example 13A | 0.005 | 5 | 4 |
| Example 14A | 0.005 | 5 | 4 |
| Example 15A | 0.01 | 5 | 5 |
| Example 16A | 0.015 | 5 | 5 |
| Example 17A | 0.04 | 5 | 5 |
| Example 18A | 0.06 | 4 | 5 |
| Example 19A | 0.08 | 3 | 5 |
| Example 20A | 0.1 | 2 | 5 |
| Example 21A | 0.015 | 5 | 5 |
| Example 22A | 0.015 | 5 | 5 |
| Example 23A | 0.015 | 5 | 5 |
| Example 24A | 0.015 | 5 | 4 |
| Example 25A | 0.015 | 5 | 4 |
| Example 26A | 0.015 | 5 | 5 |
| Example 27A | 0.015 | 5 | 5 |
| Example 28A | 0.015 | 5 | 4 |
| Example 29A | 0.08 | 2 | 4 |
| Example 30A | 0.08 | 2 | 4 |
| Example 31A | 0.08 | 2 | 4 |

| Comparative Examples | Proportions of components (weight part) Polyolefin | | |
|---|---|---|---|
| | (A1) | (A2) | (A3) |
| Comp. Example 1A | 94 | | |
| Comp. Example 2A | | | 60 |
| Comp. Example 3A | | | 60 |
| Comp. Example 4A | | | 60 |
| Comp. Example 5A | | | |
| Comp. Example 6A | | | |
| Comp. Example 7A | | | |

| Comparative Examples | Proportions of components (weight part) Crosslinking agent | | | |
|---|---|---|---|---|
| | (B1) | (B2) | (B3) | (B4) |
| Comp. Example 1A | | | | |
| Comp. Example 2A | 34 | | | |
| Comp. Example 3A | | | 34 | |
| Comp. Example 4A | | | | 34 |
| Comp. Example 5A | 94 | | | |
| Comp. Example 6A | | | 94 | |
| Comp. Example 7A | | | | 94 |

| Comparative Examples | Coating thickness (g/cm²) | Appearance | Adhesion property |
|---|---|---|---|
| Comp. Example 1A | 0.05 | 4 | 2 |
| Comp. Example 2A | 0.08 | 2 | 3 |
| Comp. Example 3A | 0.02 | 5 | 3 |
| Comp. Example 4A | 0.02 | 4 | 3 |
| Comp. Example 5A | 0.02 | 5 | 1 |
| Comp. Example 6A | 0.02 | 3 | 1 |
| Comp. Example 7A | 0.02 | 3 | 1 |

TABLE 2

| Examples | Proportions of components (weight part) Polyolefin | |
|---|---|---|
| | (A4) | (A5) |
| Example 1B | | 87 |
| Example 2B | | 80 |
| Example 3B | | 70 |
| Example 4B | | 60 |
| Example 5B | | 50 |
| Example 6B | | 40 |
| Example 7B | | 30 |
| Example 8B | | 10 |
| Example 9B | | 87 |
| Example 10B | | 80 |
| Example 11B | | 70 |
| Example 12B | | 60 |
| Example 13B | | 50 |
| Example 14B | | 60 |
| Example 15B | | 60 |
| Example 16B | | 60 |
| Example 17B | | 60 |
| Example 18B | | 60 |
| Example 19B | | 60 |
| Example 20B | | 60 |
| Example 21B | | 80 |
| Example 22B | | 60 |
| Example 23B | | 40 |
| Example 24B | | 30 |
| Example 25B | | 80 |
| Example 26B | | 60 |
| Example 27B | | 40 |
| Example 28B | | 30 |

| Examples | Proportions of components (weight part) Crosslinking agent | | | |
|---|---|---|---|---|
| | (B1) | (B2) | (B3) | (B4) |
| Example 1B | 7 | | | |
| Example 2B | 14 | | | |
| Example 3B | 24 | | | |
| Example 4B | 34 | | | |
| Example 5B | 44 | | | |
| Example 6B | 54 | | | |
| Example 7B | 64 | | | |
| Example 8B | 84 | | | |
| Example 9B | 7 | | | |
| Example 10B | 14 | | | |
| Example 11B | 24 | | | |
| Example 12B | 34 | | | |
| Example 13B | 44 | | | |
| Example 14B | 24 | 10 | | |
| Example 15B | 24 | 10 | | |
| Example 16B | 24 | 10 | | |
| Example 17B | 24 | 10 | | |
| Example 18B | 24 | 10 | | |
| Example 19B | 24 | 10 | | |
| Example 20B | 24 | 10 | | |
| Example 21B | | | 14 | |
| Example 22B | | | 34 | |
| Example 23B | | | 54 | |
| Example 24B | | | 64 | |
| Example 25B | | | | 14 |
| Example 26B | | | | 34 |
| Example 27B | | | | 54 |
| Example 28B | | | | 64 |

| Examples | Coating thickness (g/cm²) | Appearance | Adhesion property |
|---|---|---|---|
| Example 1B | 0.02 | 4 | 5 |
| Example 2B | 0.02 | 4 | 5 |
| Example 3B | 0.02 | 4 | 5 |
| Example 4B | 0.02 | 4 | 5 |
| Example 5B | 0.02 | 4 | 5 |
| Example 6B | 0.02 | 4 | 5 |
| Example 7B | 0.02 | 4 | 5 |
| Example 8B | 0.02 | 4 | 5 |
| Example 9B | 0.005 | 5 | 4 |
| Example 10B | 0.005 | 5 | 4 |
| Example 11B | 0.005 | 5 | 4 |
| Example 12B | 0.005 | 5 | 4 |
| Example 13B | 0.005 | 5 | 4 |
| Example 14B | 0.005 | 5 | 4 |
| Example 15B | 0.01 | 5 | 5 |
| Example 16B | 0.015 | 5 | 5 |
| Example 17B | 0.04 | 5 | 5 |
| Example 18B | 0.06 | 4 | 5 |
| Example 19B | 0.08 | 3 | 5 |
| Example 20B | 0.1 | 2 | 5 |
| Example 21B | 0.015 | 5 | 5 |
| Example 22B | 0.015 | 5 | 5 |

TABLE 2-continued

| | | | | |
|---|---|---|---|---|
| Example 23B | 0.015 | 5 | 5 | |
| Example 24B | 0.015 | 5 | 4 | |
| Example 25B | 0.015 | 5 | 4 | |
| Example 26B | 0.015 | 5 | 5 | |
| Example 27B | 0.015 | 5 | 5 | |
| Example 28B | 0.015 | 5 | 4 | |
| Comp. Example 4B | 0.02 | 3 | 1 | |
| Comp. Example 5B | 0.08 | 2 | 3 | |
| Comp. Example 6B | 0.02 | 5 | 3 | |
| Comp. Example 7B | 0.02 | 4 | 3 | |

| Comparative Examples | Proportions of components (weight part) Polyolefin | |
|---|---|---|
| | (A4) | (A5) |
| Comp. Example 1B | | 94 |
| Comp. Example 2B | | |
| Comp. Example 3B | | |
| Comp. Example 4B | | |
| Comp. Example 5B | 60 | |
| Comp. Example 6B | 60 | |
| Comp. Example 7B | 60 | |

| Comparative Examples | Proportions of components (weight part) Crosslinking agent | | | |
|---|---|---|---|---|
| | (B1) | (B2) | (B3) | (B4) |
| Comp. Example 1B | | | | |
| Comp. Example 2B | 94 | | | |
| Comp. Example 3B | | | 94 | |
| Comp. Example 4B | | | | 94 |
| Comp. Example 5B | 34 | | | |
| Comp. Example 6B | | | 34 | |
| Comp. Example 7B | | | | 34 |

| Comparative Examples | Coating thickness (g/cm²) | Appearance | Adhesion property |
|---|---|---|---|
| Comp. Example 1B | 0.05 | 4 | 2 |
| Comp. Example 2B | 0.02 | 5 | 1 |
| Comp. Example 3B | 0.02 | 3 | 1 |
| Comp. Example 4B | 0.02 | 3 | 1 |
| Comp. Example 5B | 0.08 | 2 | 3 |
| Comp. Example 6B | 0.02 | 5 | 3 |
| Comp. Example 7B | 0.02 | 4 | 3 |

INDUSTRIAL APPLICABILITY

The film of the present invention is a biaxially stretched polyester film having an excellent adhesion property to polyolefins, and therefore can be suitably used in the applications such as extrusion lamination with polyolefins.

The invention claimed is:

1. A laminated polyester film comprising a polyester film and a coating layer formed on a surface of the polyester film which is formed by applying a coating composition comprising a modified polyolefin which is copolymerized with a polyalkyleneoxide or a polyalkyleneimine and has two melting points, and at least one crosslinking agent, and then drying the coating composition applied, wherein a coating amount of the coating composition is 0.005 to 0.08 g/m².

2. A laminated polyester film according to claim 1, wherein a coating amount of the coating composition is 0.005 to 0.06 g/m².

3. A laminated polyester film according to claim 1, wherein the modified polyolefin is a modified polypropylene.

4. A laminated polyester film according to claim 1, wherein the two melting points are a first melting point and a second melting point,
wherein the first melting point is in the range of 0 to 50° C., and
the second melting point is in the range of 50 to 180° C.

* * * * *